United States Patent
Chen et al.

(10) Patent No.: US 7,397,739 B2
(45) Date of Patent: Jul. 8, 2008

(54) METHOD AND APPARATUS FOR DETECTING POSITION OF BLANK AREA OF OPTICAL DISC

(75) Inventors: Hao-Cheng Chen, Taipei Hsien (TW); Wen-Yi Wu, Hsin-Chu Hsien (TW); Chun-Nan Chen, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 399 days.

(21) Appl. No.: 10/905,183

(22) Filed: Dec. 20, 2004

(65) Prior Publication Data

US 2005/0141381 A1 Jun. 30, 2005

(30) Foreign Application Priority Data

Dec. 30, 2003 (TW) .............................. 92137487 A (51) Int. Cl.
*G11B 7/00* (2006.01)
(52) U.S. Cl. ................................. 369/47.27; 369/53.24
(58) Field of Classification Search .............. 369/53.24, 369/47.27
See application file for complete search history.

(56) References Cited

U.S. PATENT DOCUMENTS

| | | | | |
|---|---|---|---|---|
| 4,403,266 A * | 9/1983 | Kamimura et al. | ............ | 360/75 |
| 5,434,838 A * | 7/1995 | Haneda | .................... | 369/53.15 |
| 5,633,841 A * | 5/1997 | Yokota et al. | ............ | 369/30.23 |
| 6,728,180 B1* | 4/2004 | Park | ........................ | 369/53.11 |
| 6,839,311 B1* | 1/2005 | Yamanoi et al. | ......... | 369/53.21 |
| 6,894,964 B2* | 5/2005 | Park et al. | ................ | 369/53.34 |
| 2003/0218951 A1* | 11/2003 | Suzuki et al. | ............ | 369/53.24 |
| 2006/0083141 A1* | 4/2006 | Teranishi et al. | ......... | 369/53.24 |

* cited by examiner

*Primary Examiner*—Thang V. Tran
*Assistant Examiner*—Van T Pham
(74) *Attorney, Agent, or Firm*—Winston Hsu (57) ABSTRACT

An apparatus for detecting position of blank areas for an optical disc in an optical disc drive according to a wobble signal and a blank signal includes an address decoder for generating a physical address value according to the wobble signal; a counting device coupled to the address decoder for generating a count value according to the wobble signal; and a decision circuit coupled to the counting device for determining whether the count value is within a predetermined range when the edge of the blank signal occurs. If the count value is within the predetermined range when the blank edge occurs, the decision circuit generates a position value corresponding to a blank area of the optical disc.

31 Claims, 5 Drawing Sheets

METHOD AND APPARATUS FOR DETECTING POSITION OF BLANK AREA OF OPTICAL DISC

BACKGROUND OF INVENTION

The present invention relates to a method and apparatus for detecting position of blank areas of an optical disc, and more particularly, to a method and apparatus for detecting position of blank areas of an optical disc in an optical disc drive.

Recordable Digital Versatile Disc (DVD) and re-writable DVD have various formats, such as DVD-R, DVD-RW, DVD+R, DVD+RW, and DVD-RAM etc. In general, when a recordable DVD drive writes data onto a recordable (or re-writable) DVD, it first identifies the end position of recorded data and then writes new data into a blank area of the optical disc starting from the end position in order to improve the usage efficiency of the optical disc.

The method used for determining the end position of the recorded data in the recordable (or re-writable) DVD of the related art determines the end position of recorded data using the data recorded in the programmable memory area (PMA) of the DVD.

However, while the recordable DVD drive writes data into the recordable (or re-writable) DVD, in some situations such as a tiny variation of the pick-up head, the recordable DVD drive is shocked and may result in the actual end position of recorded data differing from an end position recorded in the PMA.

As mentioned above, the method used for determining the end position of recorded data of the related art by using the end position recorded in the PMA of the recordable (or re-writable) DVD cannot accurately identify the actual end position of recorded data of the DVD. If the recordable DVD drive writes data onto the DVD starting at an incorrect end position, this may result in error of recorded data and thereby damage the existing data of the DVD.

SUMMARY OF INVENTION

It is therefore an objective of the claimed invention to provide a detecting apparatus for detecting positions of blank areas of an optical disc in an optical disc drive.

According to a preferred embodiment, the detecting apparatus of the present invention includes: an address decoder for generating a physical address value according to a wobble signal; a counting device coupled to the address decoder for generating a count value according to the wobble signal; and a decision circuit coupled to the counting device for determining whether the count value is within a predetermined range when an edge of the blank signal occurs; wherein if the count value does not match the corresponding physical address value, the counting device is capable of updating the count value with the physical address value; and that if the count value is within the predetermined range when the edge of the blank signal occurs, the decision circuit generates a position value corresponding to a blank area of the optical disc.

Another objective of the present invention is to provide a detecting method for detecting position of blank areas of an optical disc. The method includes: generating a count value according to a wobble signal; receiving a blank signal; determining whether the count value is within a predetermined range when an edge of the blank signal occurs; and if the count value is within the predetermined range when the edge of the blank signal occurs, generating a position value corresponding to a blank area of the optical disc.

DETAILED DESCRIPTION

Figure 1:
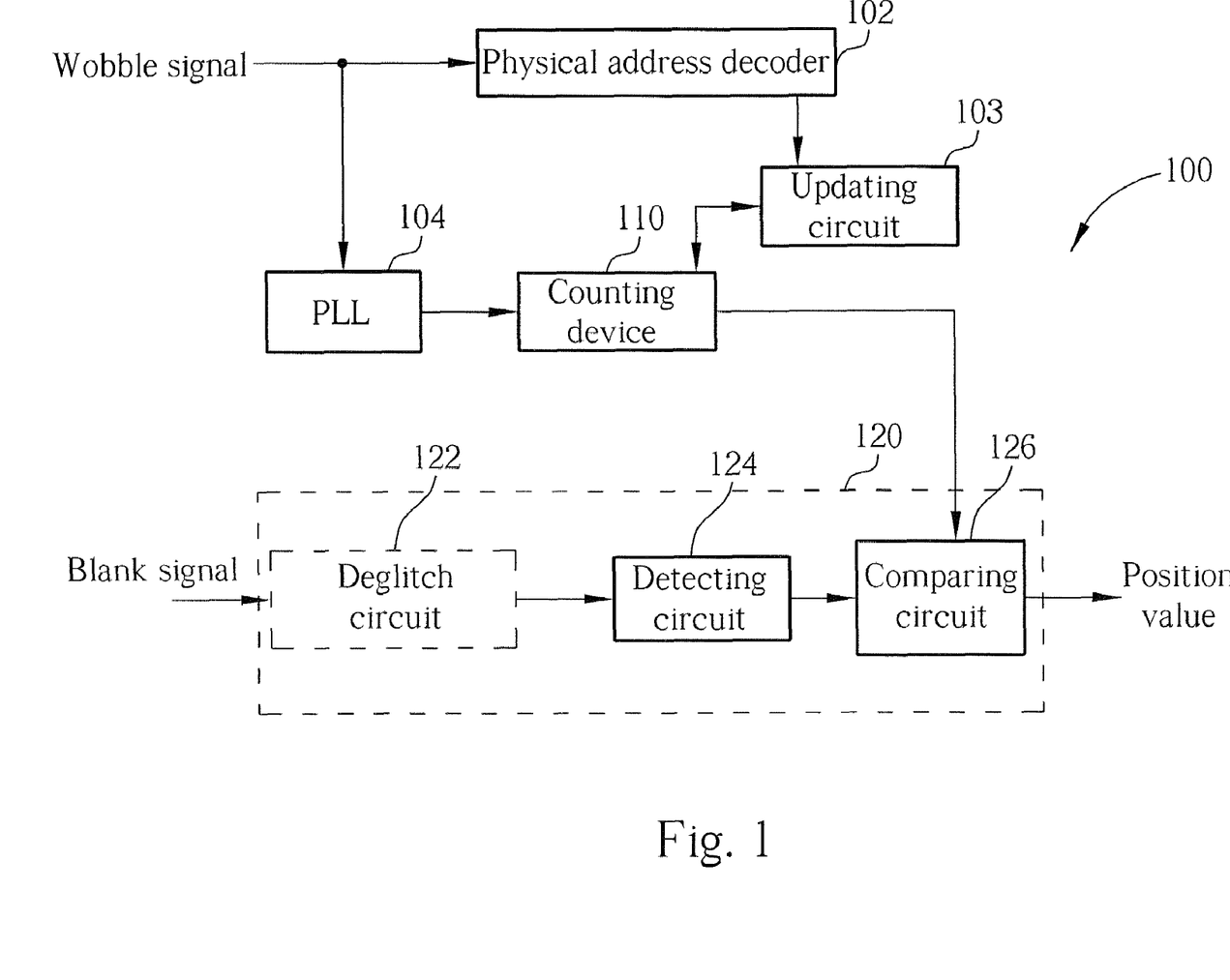
FIG. 1 is a block diagram of a detecting apparatus according to the present invention.

Please refer to FIG. 1, which depicts a schematic diagram of a detection apparatus 100 for detecting a blank area of an optical disc in an optical disc drive according to the present invention. The detection apparatus 100 comprises a physical address decoder 102 for generating a physical address value by decoding a wobble signal reproduced from the optical disc by the optical disc. The detection apparatus 100 further comprises a phase-locked loop (PLL) 104 for generating a wobble clock according to the wobble signal; a counting device 110 coupled to the physical address decoder 102 and the PLL 104 for generating a count value according to the wobble signal; an updating circuit 103; and a decision circuit 120 coupled to the counting device 110 for receiving the count value and a blank signal generated from the optical disc drive. In practical implementations, the counting device 110 can be composed of a plurality of cascaded counting units where each counting unit carries over to its next stage. The counting device 110 can also be a single counting unit for counting the wobble clock and for thereupon outputting a plurality of count values representing different orders.

Figure 4:
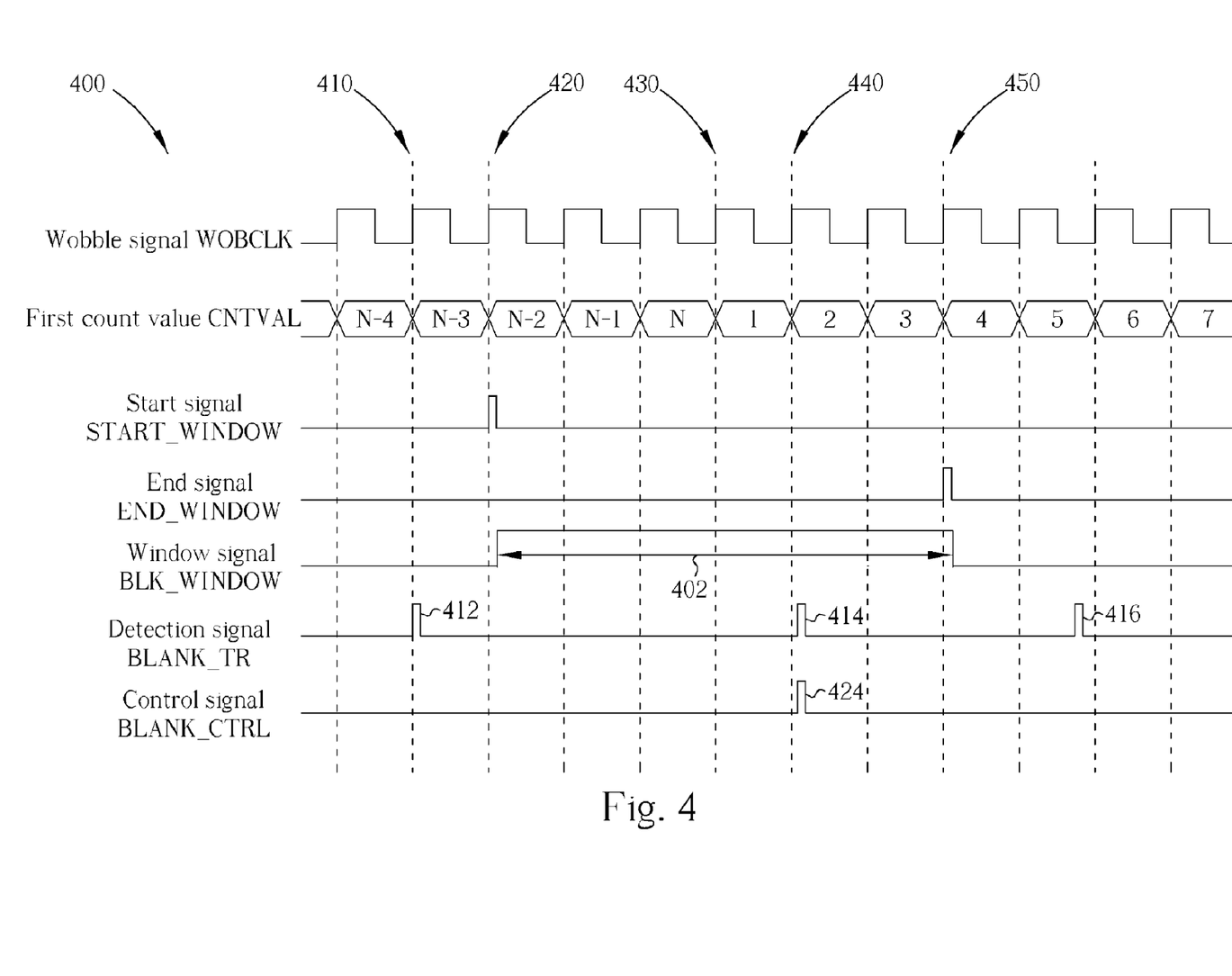
FIG. 4 is a timing diagram of the comparing circuit of FIG. 3.

In general, the optical disc has a reflective surface used for reflecting a laser beam emitted from the optical disc drive. There is a data groove and a wobble groove on the reflective surface. The data groove is used for recording data and the wobble groove is a continuous groove configured on a side of the data groove. When reading the optical disc, the optical disc drive generates a wobble signal based on the wobble groove. In one embodiment of the present invention, the detection apparatus 100 utilizes the PLL 104 to process the wobble signal to generate a wobble clock with a square waveform as shown in FIG. 4. The method used for converting the wobble signal into the wobble clock is well known in the art, and further details are therefore omitted here.

As shown in FIG. 1, the decision circuit 120 comprises a detecting circuit 124 for detecting an edge of a received blank signal; and a comparing circuit 126 coupled to the detecting circuit 124 and the counting device 110. The comparing circuit 126 of the decision circuit 120 is used for determining whether the blank signal occurs at a correct position. The decision circuit 120 can further utilize a de-glitch circuit 122 to reduce noise in the blank signal, so that the detecting circuit 124 can detect the edge position of the blank signal more accurately.

When reading a blank area recorded without any data, the optical disc drive generates a blank signal. Ideally, if the optical disc is a DVD-R/-RW disc, the blank signal should occur near the boundary of an error correction code (ECC) block; if the optical disc is a DVD+R/+RW disc, the blank signal should occur near the boundary of an Address in a Pre-groove (ADIP) word. However, an undesired glitch may occur if the optical disc has defects or the optical disc drive is interfered with while reading the optical disc. In order to improve the detection accuracy of blank areas in the optical disc, the detection apparatus 100 of the present invention can feedback the count value of the wobble clock, which corresponds to the physical address of the optical disc, to the comparing circuit 126 of the decision circuit 120 in order to filter out the glitch generated by the optical disc drive.

In a preferred embodiment of the present invention, the counting device 110 comprises a first counting unit and a second counting unit. The first counting unit is used for generating a first count value CNTVAL according to the wobble clock WOBCLK. When the first count value CNTVAL has accumulated to a specific value corresponding to the length of an ECC block or an ADIP word, it carries a one over to the second counting unit. Accordingly, the second counting unit generates a second count value CARRY_VAL. In other words, when the second count value CARRY_VAL is X, it means the Xth ECC block or ADIP word in the optical disc is detected. When the first count value CNTVAL is Y, it indicates a position corresponds to Y wobble clocks in the ECC block or ADIP word. A person skilled in the art can easily convert the first count value CNTVAL and the second count value CARRY_VAL into a corresponding physical address value.

Thus, when a blank signal occurs, the comparing circuit 126 checks whether the first count value CNTVAL (and also the second count value CARRY_VAL if necessary) generated by the counting device 110 is within a predetermined range corresponding to the boundary of an ECC block or an ADIP word to determine the correctness of the blank signal. If the first count value CNTVAL is within the predetermined range, the decision circuit 120 generates a position value of a blank area corresponding to the blank signal according to the count value. In the following, a flowchart is employed to illustrate the detailed operation of the detection apparatus 100 in accordance with the present invention.

Figure 2:
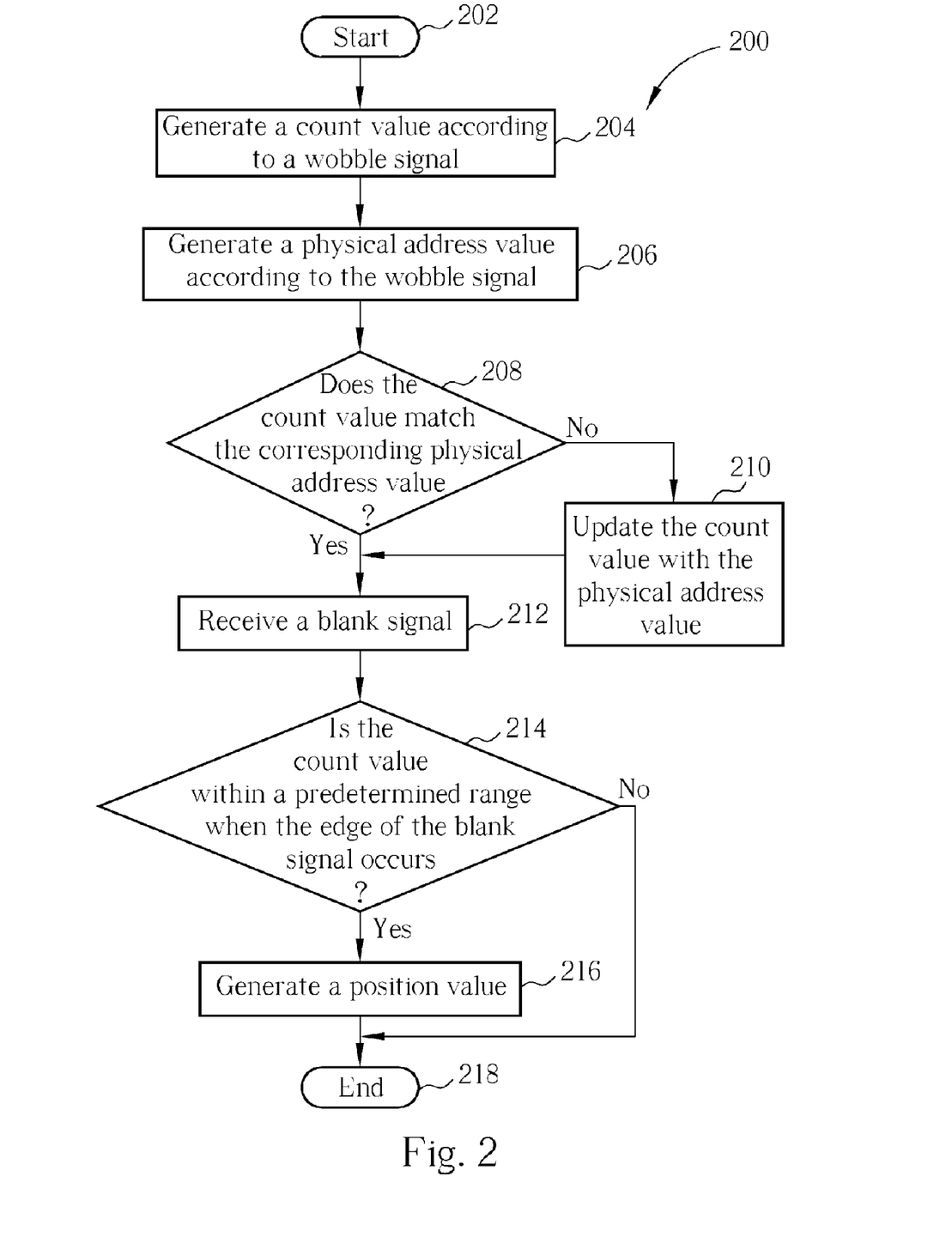
FIG. 2 is a flowchart of detecting method according to the present invention.

FIG. 2 depicts a flowchart 200 of the operation of the detection apparatus 100 according to one embodiment of the present invention. The flowchart 200 comprises the following steps:

Step 202: Start.

Step 204: Generate a first count value CNTVAL and a second count value CARRY_VAL according to a wobble signal.

Step 206: Generate a physical address value according to the wobble signal.

Step 208: Determine whether or not the first count value CNTVAL and the second count value CARRY_VAL match the physical address value. If yes, perform step 212; otherwise, perform step 210.

Step 210: Update the first count value CNTVAL and the second count value CARRY_VAL with the physical address value.

Step 212: Receive a blank signal BLANK.

Step 214: Determine whether the first count value CNTVAL is within a predetermined range when an edge of the blank signal BLANK occurs. If yes, perform step 216; otherwise, perform step 218.

Step 216: The detection apparatus 100 generates a corresponding position value according to the first count value CNTVAL and the second count value CARRY_VAL.

Step 218: End.

First of all, the PLL 104 of the detection apparatus 100 is employed to extract a wobble clock WOBCLK from the wobble signal. The counting device 110 is then employed to count pulses of the wobble clock WOBCLK.

As mentioned above, when the first count value CNTVAL has accumulated to a specific value (which corresponds to the length of an ECC block or an ADIP word), a one is carried over to the second counting unit so that the second count value CARRY_VAL pluses 1. At that moment, the first counting unit resets the first count value CNTVAL and starts a new counting cycle. In practical implementations, the counting device 110 can adjust the specific value according to the format of the optical disc. For example, in the DVD-R/-RW format, each ECC block of the optical disc has 16 sectors and each sector comprises 26 frames. The length of each frame corresponds to the count value of 8 wobble clocks. In the DVD+R/+RW format, each ADIP word of the optical disc has 13 ADIP units and each ADIP unit comprises 4 ADIP data bits. The length of each ADIP data bit corresponds to a count value of 93 wobble clocks. Therefore, in a preferred embodiment of the present invention, if the format of the optical disc is DVD-R/-RW, the counting device 110 sets the specific value as 3328 (16×26×8=3328). In other words, when the first count value CNTVAL has accumulated to 3328, the first counting unit renews its counting operation and the second count value CARRY_VAL is incremented by 1. If the optical disc is a DVD+R/+RW disc, the counting device 110 sets the specific value as 4836 (13×4×93=4836). Therefore, when the first count value CNTVAL has accumulated to 4836, the second count value CARRY_VAL is incremented by 1.

In step 206, once the received wobble signals of the physical address decoder 102 corresponds to the length of an ECC block or an ADIP word, the physical address decoder 102 generates a physical address value by decoding the received wobble signals. Accordingly, for successive ECC blocks or ADIP words, the physical address decoder 102 sequentially generates corresponding physical address values Physical_A1, Physical_A2 and so forth.

In general, a physical address value obtained using the conversion of the first count value CNTVAL and the second count value CARRY_VAL should match a physical address value generated by the physical address decoder 102. Therefore, in step 208, the updating circuit 103 of the detection apparatus 100 determines whether or not the first count value CNTVAL and the second count value CARRY_VAL match the physical address value generated by the physical address decoder 102. If they do not match, the updating circuit 103 of the detection apparatus 100 executes step 210 to update the first count value CNTVAL and the second count value CARRY_VAL with the physical address value generated by the physical address decoder 102 in order to avoid affecting the detection accuracy of the present invention. In practice, the updating circuit 103 of the detection apparatus 100 only checks the first count value CNTVAL and the second count value CARRY_VAL once at the time the physical address decoder 102 generates the first physical address value, or checks the two count values each time the physical address decoder 102 generates a physical address value.

In step 212, a blank signal BLANK generated by the optical disc drive while reading the optical disc is transmitted to the detecting circuit 124 of the decision circuit 120. In a preferred embodiment of the present invention, the detecting circuit 124 detects the edge of the blank signal BLANK to generate a detection signal BLANK_TR. As mentioned above, the decision circuit 120 can also utilize the de-glitch circuit 122 to receive and to process the blank signal BLANK, and the processed blank signal BLANK is then transmitted to the detecting circuit 124. Therefore, the accuracy of the detecting circuit 124 to detect the edge of the blank signal is improved.

In step 214, the comparing circuit 126 of the decision circuit 120 receives the detection signal BLANK_TR generated from the detecting circuit 124 and determines whether the first count value CNTVAL received at the moment is within the predetermined range. As mentioned above, the blank signal BLANK generally occurs around the boundary of an ECC block or an ADIP word. In other words, when the comparing circuit 126 receives the detection signal BLANK_TR, the first count value CNTVAL transmitted from the counting device 110 should correspond to the boundary of an ECC block or an ADIP word, i.e. the first count value CNTVAL should be within the predetermined range. If the first count value CNTVAL is not within the predetermined range, the comparing circuit 126 judges the blank signal BLANK corresponding to the detection signal BLANK_TR to be noise or a spike generated by the optical disc drive and not a real blank signal.

On the other hand, if the first count value CNTVAL transmitted from the counting device 110 is within the predetermined range when the comparing circuit 126 receives the detection signal BLANK_TR, the detection apparatus 100 further executes step 216 to generate a position value corresponding to a blank area of the optical disc. In one embodiment of the present invention, the position value is a physical address value converted from the first count value CNTVAL and the second count value CARRY_VAL by the detection apparatus 100. In another embodiment of the present invention, the detection apparatus 100 directly outputs the first count value CNTVAL and the second count value CARRY_VAL corresponding to the physical address value as a position value. In practice, the position value can be any format that represents the position of the blank area of the optical disc.

Figure 3:
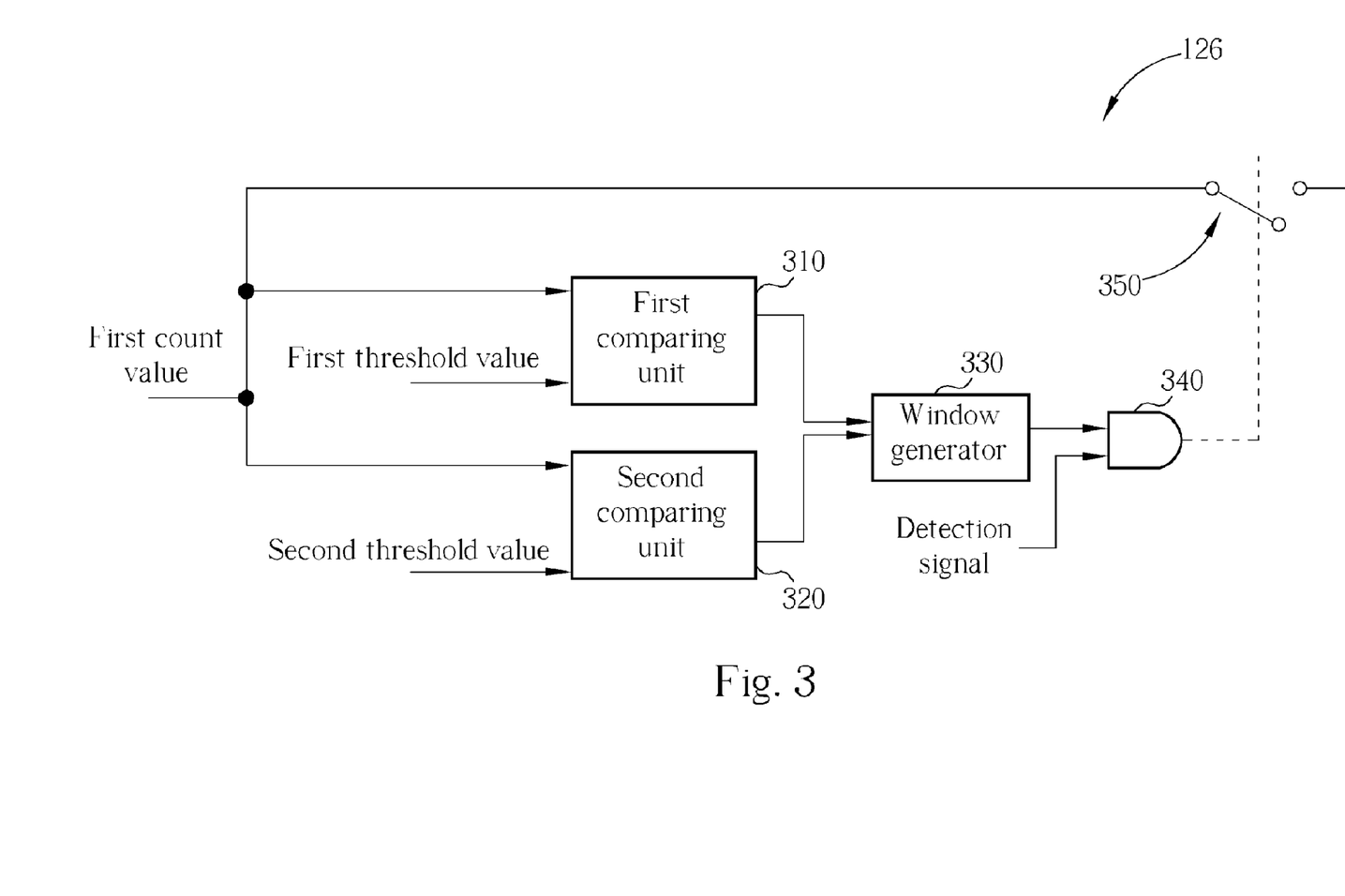
FIG. 3 is a block diagram of a comparing circuit of FIG. 1 according to one embodiment of the present invention.

Please refer to FIG. 3, which depicts a schematic diagram of the comparing circuit 126 of FIG. 1 according to one embodiment of the present invention. The comparing circuit 126 comprises a first comparing unit 310 for comparing the first count value CNTVAL and a first threshold value to generate a start signal START_WINDOW; a second comparing unit 320 for comparing the first count value CNTVAL and a second threshold value to generate an end signal END_WINDOW; a window generator 330 for generating a window signal BLK_WINDOW according to the start signal START_WINDOW and the end signal END_WINDOW; an AND gate 340 for generating a control signal BLANK_CTRL according to the window signal BLK_WINDOW; and a switch 350 for selectively outputting the first count value CNTVAL according to the control signal BLANK_CTRL. Wherein the first threshold value and the second threshold value define the predetermined range.

In practical implementations, the first and the second threshold values can be pre-stored in a register (not shown) of the detection apparatus 100 of FIG. 1 or can be stored in the first comparing unit 310 and the second comparing unit 320 of the comparing circuit 126, respectively. Additionally, the first and the second threshold values can also be implemented in any form that supports the operation of the comparing circuit 126. In other embodiments, the detection apparatus 100 adjusts the first and the second threshold values depending on the format of the optical disc, or selects one of a plurality of predefined combinations of the two thresholds according to the format of the optical disc.

Please refer to FIG. 4, as well as to FIG. 1 and FIG. 3. FIG. 4 is a timing diagram 400 of the comparing circuit 126 of FIG. 3. For convenient illustration, the first threshold value is assumed as N−3 and the second threshold value is assumed as 3 in the timing diagram 400. As shown in FIG. 4, the first count value CNTVAL is increased progressively with the wobble clock WOBCLK. At time 430, since the first count value CNTVAL has accumulated to a specific value N (e.g., N=3328 in DVD−R/−RW format and N=4836 in DVD+R/+RW format) configured by the counting device 110. Therefore, the counting device 110 resets the first count value CNTVAL and renews its counting operation.

Figure 5:
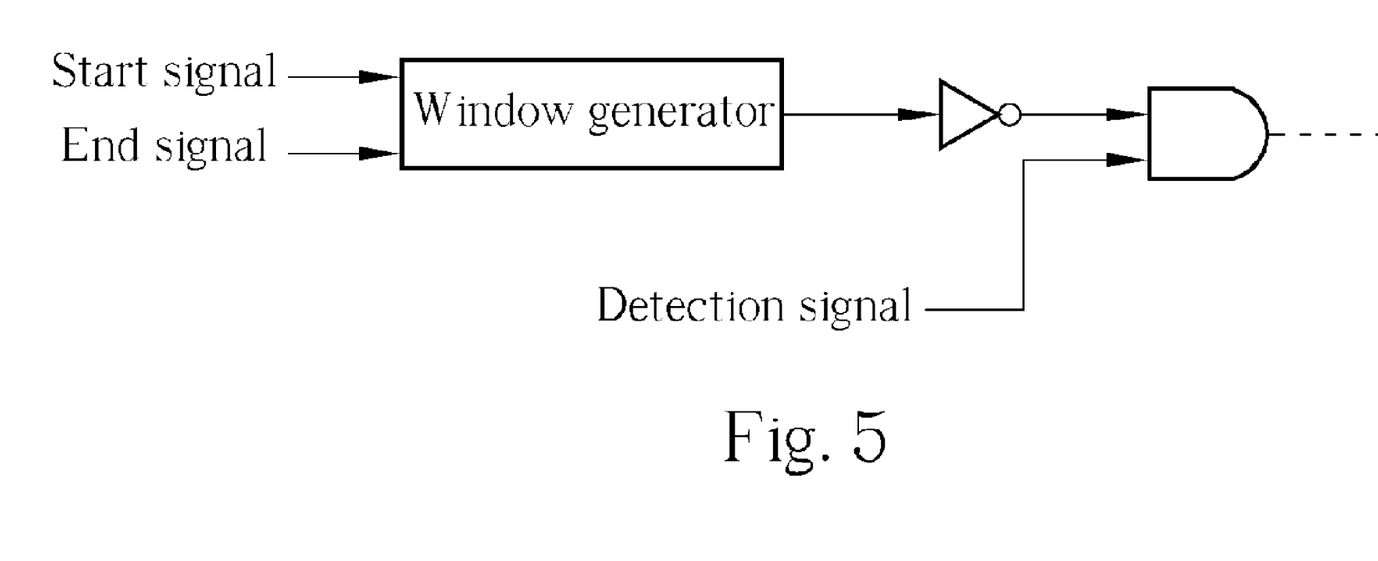
FIG. 5 is a block diagram of another embodiment of part of the comparing circuit of FIG. 3.

At time 420, the first count value CNTVAL received by the first comparing unit 310 is N−3, which matches the first threshold value, so that the first comparing unit 310 triggers the start signal START_WINDOW. At time 450, since the first count value CNTVAL received by the second comparing unit 320 is 3, which matches the second threshold value, so that the second comparing unit 320 triggers the end signal END_WINDOW. When receiving the start signal START_WINDOW, the window generator 330 of the comparing circuit 126 sets its output at a first logic state; when receiving the end signal END_WINDOW, the window generator 330 sets its output at a second logic state. In one embodiment of the present invention, for example, the first logic state is logic 1 and the second logic state is logic 0. Note that, the foregoing setting of the first logic state and the second logic state is just an example. In practice, if the following stage is adjusted properly, the first and the second logic state can be exchanged with each other. For example, FIG. 5 depicts another embodiment of the window generator 330 and the AND logic 340 of the comparing circuit 126.

As mentioned above, the window generator 330 generates the window signal BLK_WINDOW shown in FIG. 4 according to the start signal START_WINDOW and the end signal END_WINDOW. The window signal BLK_WINDOW defines an interval 402.

Please refer back to FIG. 3. The AND gate 340 generates the control signal BLANK_CTRL according to the window signal BLK_WINDOW and the detection signal BLANK_TR. The detection signal BLANK_TR of the timing diagram 400 has a plurality of pulses, such as pulse 412, 414 and 416. However, the pulses 412 and 414 which are outside the interval 402 defined by the window signal BLK_WINDOW are ignored by the AND gate 340. In other words, only the detection signal which is inside the interval 402 is regarded as a correct blank signal, the others are regarded as noise and are filtered out.

Therefore, when the AND logic 340 receives the pulse 414 of the detection signal BLANK_TR that is inside the interval 402, the AND logic 340 generates a pulse 424 as shown in FIG. 4 to control the switch 350 to output the count value CNTVAL (=2) received in the comparing circuit 126 at that moment. The detection apparatus 100 of the present invention can convert the first count value CNTVAL and the second count value CARRY_VAL into a physical address value as a position value representing the boundary of a blank area corresponding to the pulse 414. In another embodiment, the detection apparatus 100 of the present invention directly outputs the first count value CNTVAL and the second count value CARRY_VAL as the position value.

Please referring back to FIG. 1. In practical implementations, the detecting circuit 124 of FIG. 1 can be designed for detecting the rising edge or the falling edge of the blank signal or can be switched between the two modes. If the detecting circuit 124 is used for detecting the rising edge of the blank signal, the detection signal corresponds to the beginning of a blank area of the optical disc. On the other hand, if the detecting circuit 124 is used for detecting the falling edge of the blank signal, the detection signal corresponds to the end of a blank area of the optical disc.

As described above, the detection apparatus 100 of the present invention feedback the wobble clock count value corresponding to the physical address of the optical disc to the decision circuit 120, so that the decision circuit 120 can filter out noise. Therefore, the detection apparatus 100 of the present invention is capable of detecting the blank position in the optical disc accurately. In addition, since the second count value CARRY_VAL represents the location of the corresponding ECC block or ADIP word, so that the detecting architecture of the present invention can also support the optical disc having a plurality of blank areas. In other words, the plurality of blank areas would be determined by the detecting architecture disclosed in the present invention, respectively.

Additionally, the present invention can further set a limitation to the location of ECC blocks or ADIP words where the blank signal possibly occurs. So that noise, which occurs within the ECC blocks or ADIP words where the blank signal impossibly occurs, can be filtered out according to the second count value CARRY_VAL. The method used for filtering noise according to the second count value CARRY_VAL is substantially the same as the method used for filtering noise in accordance with the first count value CNTVAL, and further details are therefore omitted here.

In the foregoing timing diagram 400, the first and second threshold values are assumed as N−3 and 3, respectively. This is just an example for conveniently illustrating the operation of the comparing circuit 126 of FIG. 3. In practice, the first threshold value is not necessarily limited to greater than the second threshold value. Additionally, the predetermined range defined by the first and second threshold values can be adjusted depends on the system requirement and not necessarily limited to the range between N−3 and 3.

In another embodiment, for example, the first threshold value can be set to 5 and the second threshold value can be set to N−4, wherein N is adjustable depends on the format of the optical disc. At that moment, the comparing circuit 126 of FIG. 3 only needs to configure an inverter between the window generator 330 and the AND logic 340 as the circuit shown in FIG. 5 to achieve the objective of the present invention.

According to the foregoing illustration, it is known that the detection of blank areas, which are also the beginning position where data is to be recorded, in accordance with the present invention can be accurate to the extent of wobble level.

In the preferred embodiment mentioned above, the first count value CNTVAL is incremented by 1 once the counting device 110 receives a pulse of the wobble clock WOBCLK. In another embodiment, the first count value CNTVAL is incremented by 1 when the counting device 110 receives a specific number of pulses of the wobble clock WOBCLK. For example, the first count value CNTVAL is incremented by 1 when the counting device 110 receives 93 pulses of the wobble clock WOBCLK which corresponding to the length of an ADIP word. In this embodiment, when the first count value CNTVAL has accumulated to 52, which corresponds to the length of an ADIP word, the counting device 110 resets the first count value CNTVAL and carries a one over to the second count value CARRY_VAL. In yet another embodiment, the first count value CNTVAL is incremented by 1 when the counting device 110 receives 8 pulses of the wobble clock WOBCLK, which corresponds to the length of a frame. In this embodiment, when the first count value CNTVAL is accumulated to 416, which corresponds to the length of an ECC block, the counting device 110 resets the first count value CNTVAL and carries a one over to the second count value CARRY_VAL. Of course, the first and second threshold values should be adjusted to corresponding values in different embodiments. Similarly, the counting device 110 of the present invention can adjust the number of required pulses of the wobble clock depending on the format of the optical disc.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for detecting position of a blank area of an optical disc according to a wobble signal and a blank signal in an optical disc drive, the apparatus comprising:
    a counting device for generating a count value according to the wobble signal; and
    a decision circuit coupled to the counting device determining whether the count value is within a predetermined range when an edge of the blank signal occurs;
    wherein if the count value is within the predetermined range when the edge of the blank signal occurs, the decision circuit generates a control signal corresponding to a blank area of the optical disc; the decision circuit receives the blank signal; and when the edge of the received blank signal occurs, the decision circuit determines whether the count value is within the predetermined range, and generates a position value corresponding to the blank area of the optical disc if the count value is within the predetermined range.

2. The apparatus of claim 1, further comprising:
    a phase-locked loop (PLL) for generating a wobble clock according to the wobble signal so that the counting device generates the count value based on the wobble clock.

3. The apparatus of claim 1, wherein the decision circuit adjusts the predetermined range according to a format of the optical disc.

4. The apparatus of claim 1, wherein the predetermined range corresponds to a boundary of an ECC block of the optical disc.

5. The apparatus of claim 1, wherein the predetermined range corresponds to a boundary of an ADIP word of the optical disc.

6. The apparatus of claim 1, wherein the decision circuit further comprises at least one storage medium for storing a setting of the predetermined range.

7. The apparatus of claim 1, wherein the decision circuit further comprises a detecting circuit for detecting the edge of the blank signal to generate a detection signal.

8. The apparatus of claim 7, wherein the detecting circuit is used for detecting a rising edge of the blank signal, so that the detection signal corresponds to the rising edge.

9. The apparatus of claim 7, wherein the detecting circuit is used for detecting a falling edge of the blank signal, so that the detection signal corresponds to the falling edge.

10. The apparatus of claim 7, wherein if the count value is within the predetermined range when the detection signal is generated, the decision circuit utilizes the count value as the position value corresponding to the blank area of the optical disc.

11. The apparatus of claim 7, wherein if the count value is within the predetermined range when the detection signal is generated, the decision circuit converts the count value into a corresponding physical address to be the position value corresponding to the blank area of the optical disc.

12. A method for detecting position of a blank area of an optical disc, the method comprising:
    generating a count value according to a wobble signal;
    receiving a blank signal;

determining whether the count value is within a predetermined range when an edge of the blank signal occurs; and if the count value is within the predetermined range when the edge of the blank signal occurs, generating a control signal corresponding to a blank area of the optical discs;

wherein when the edge of the received blank signal occurs, determining whether the count value is within the predetermined range is performed, and a position value corresponding to the blank area of the optical disc is generated if the count value is within the predetermined range.

13. The method of claim 12, further comprising:
generating a wobble clock according to the wobble signal and generating the count value according to the wobble clock.

14. The method of claim 12, further comprising:
generating a physical address value according to the wobble signal; and
if the count value does not match the corresponding physical address value, updating the count value with the physical address value.

15. The method of claim 12, further comprising: adjusting the predetermined range according to the format of the optical disc.

16. The method of claim 12, wherein the predetermined range corresponds to a boundary of an ECC block of the optical disc.

17. The method of claim 12, wherein the predetermined range corresponds to a boundary of an ADIP word of the optical disc.

18. The method of claim 12, further comprising:
detecting a rising edge of the blank signal; and
determining whether the count value is within the predetermined range when the rising edge of the blank signal occurs.

19. The method of claim 12, further comprising:
detecting a falling edge of the blank signal; and
determining whether the count value is within the predetermined range when the falling edge of the blank signal occurs.

20. The method of claim 12, further comprising:
if the count value is within the predetermined range when the edge of the blank signal occurs, utilizing the count value as the position value corresponding to the blank area of the optical disc.

21. The method of claim 12, further comprising:
if the count value is within the predetermined range when the edge of the blank signal occurs, converting the count value into a corresponding physical address to be the position value corresponding to the blank area of the optical disc.

22. An optical disc drive for detecting position of blank areas of an optical disc according to a wobble signal and a blank signal comprising:
a counting device for generating a count value according to the wobble signal; and a decision circuit coupled to the counting device determining whether the count value is within a predetermined range when an edge of the blank signal occurs; wherein if the count value is within the predetermined range when the edge of the blank signal occurs, the decision circuit generates a control signal corresponding to a blank area of the optical disc; the decision circuit receives the blank signal; and when the edge of the received blank signal occurs, the decision circuit determines whether the count value is within the predetermined range, and generates a position value corresponding to the blank area of the optical disc if the count value is within the predetermined range.

23. The apparatus of claim 1, further comprising:
an address decoder, coupled to the counting device, for generating a physical address value according to the wobble signal; and
an updating circuit;
wherein if the updating circuit determines that the count value does not match the corresponding physical address value, the updating circuit updates the count value of the counting device according to the physical address value.

24. The apparatus of claim 1, wherein the counting device resets the count value and starts a new counting cycle each time the count value reaches a predetermined value.

25. The apparatus of claim 24, wherein the predetermined value corresponds to a length of an ECC block or an ADIP word of the optical disc.

26. The method of claim 12, wherein generating the count value according to the wobble signal comprises:
resetting the count value and starting a new counting cycle each time the count value reaches a predetermined value.

27. The method of claim 26, wherein the predetermined value corresponds to a length of an ECC block or an ADIP word of the optical disc.

28. An apparatus for detecting position of a blank area of an optical disc
according to a wobble signal and a blank signal in an optical disc drive, the apparatus comprising:
a counting device for generating a count value according to the wobble signal; and
a decision circuit coupled to the counting device determining whether the count value is within a predetermined range when an edge of the blank signal occurs, the decision circuit further comprising a detecting circuit for detecting the edge of the blank signal to generate a detection signal;
wherein if the count value is within the predetermined range when the edge of the blank signal occurs, the decision circuit generates a control signal corresponding to a blank area of the optical disc; and if the count value is within the predetermined range when the detection signal is generated, the decision circuit utilizes the count value as a position value corresponding to the blank area of the optical disc.

29. An apparatus for detecting position of a blank area of an optical disc according to a wobble signal and a blank signal in an optical disc drive, the apparatus comprising:
a counting device for generating a count value according to the wobble signal; and
a decision circuit coupled to the counting device determining whether the count value is within a predetermined range when an edge of the blank signal occurs, the decision circuit further comprising a detecting circuit for detecting the edge of the blank signal to generate a detection signal;
wherein if the count value is within the predetermined range when the edge of the blank signal occurs, the decision circuit generates a control signal corresponding to a blank area of the optical disc; and if the count value is within the predetermined range when the detection signal is generated, the decision circuit converts the count value into a corresponding physical address to be a position value corresponding to the blank area of the optical disc.

30. A method for detecting position of a blank area of an optical disc, the method comprising:

generating a count value according to a wobble signal;

receiving a blank signal;

determining whether the count value is within a predetermined range when an edge of the blank signal occurs;

if the count value is within the predetermined range when the edge of the blank signal occurs, generating a control signal corresponding to a blank area of the optical disc;

generating a physical address value according to the wobble signal; and if the count value does not match the corresponding physical address value, updating the count value with the physical address value.

31. An apparatus for detecting position of a blank area of an optical disc according to a wobble signal and a blank signal in an optical disc drive, the apparatus comprising:

a counting device for generating a count value according to the wobble signal;

a decision circuit coupled to the counting device determining whether the count value is within a predetermined range when an edge of the blank signal occurs;

an address decoder, coupled to the counting device, for generating a physical address value according to the wobble signal; and an updating circuit;

wherein if the count value is within the predetermined range when the edge of the blank signal occurs, the decision circuit generates a control signal corresponding to a blank area of the optical disc; and if the updating circuit determines that the count value does not match the corresponding physical address value, the updating circuit updates the count value of the counting device according to the physical address value.

* * * * *